United States Patent
Vijayaraghavan et al.

(10) Patent No.: US 11,313,697 B2
(45) Date of Patent: Apr. 26, 2022

(54) SYSTEMS AND APPARATUSES FOR GENERATING A GEOMETRIC SHAPE AND TRAVEL TIME DATA

(71) Applicant: Move, Inc., Westlake Village, CA (US)

(72) Inventors: Jayakrishnan Vijayaraghavan, Santa Clara, CA (US); Eric Onno, Vancouver (CA); Lu Zou, Richmond (CA); Milad Mohammadi, Santa Clara, CA (US); Nitin Gandhi, Burnaby (CA)

(73) Assignee: MOVE, INC., Westlake Village, CA (US)

( * ) Notice: Subject to any disclaimer, the term of this patent is extended or adjusted under 35 U.S.C. 154(b) by 333 days.

(21) Appl. No.: 16/389,862

(22) Filed: Apr. 19, 2019

(65) Prior Publication Data
US 2020/0333156 A1 Oct. 22, 2020

(51) Int. Cl.
*G01C 21/36* (2006.01)
*G06F 16/29* (2019.01)

(52) U.S. Cl.
CPC ....... *G01C 21/367* (2013.01); *G01C 21/3679* (2013.01); *G01C 21/3697* (2013.01); *G06F 16/29* (2019.01)

(58) Field of Classification Search
CPC .............. G01C 21/367; G01C 21/3679; G01C 21/3697; G06F 16/29
See application file for complete search history.

(56) References Cited

U.S. PATENT DOCUMENTS

| | | | |
|---|---|---|---|
| 5,899,955 A * | 5/1999 | Yagyu | G01C 21/3446 701/533 |
| 10,360,449 B2 * | 7/2019 | Chandrashekar | G06K 9/00476 |
| 2006/0212218 A1 * | 9/2006 | Smith | G01C 21/3679 701/426 |
| 2006/0270421 A1 * | 11/2006 | Phillips | H04W 4/021 455/457 |
| 2009/0171570 A1 * | 7/2009 | Chiba | G01C 21/3682 701/532 |
| 2013/0253832 A1 * | 9/2013 | Nallu | G01C 21/3667 701/537 |
| 2014/0278038 A1 * | 9/2014 | Stankoulov | G06T 11/203 701/123 |
| 2016/0169695 A1 * | 6/2016 | Hall | G06Q 30/0261 701/426 |
| 2017/0289754 A1 * | 10/2017 | Anderson | H04W 4/029 |
| 2019/0101402 A1 * | 4/2019 | Chien | G01C 21/3682 |
| 2019/0390972 A1 * | 12/2019 | Jiao | G06F 16/29 |
| 2020/0018607 A1 * | 1/2020 | Balu | G08G 1/065 |

* cited by examiner

*Primary Examiner* — Rami Khatib
*Assistant Examiner* — Gabriel J Lambert
(74) *Attorney, Agent, or Firm* — Alston & Bird LLP

(57) ABSTRACT

Various embodiments of the present invention provide an apparatus, method, and computer program product for mapping points of interest relative to a geometric shape defined on a map. More specifically, an apparatus, method, and computer program product is provided wherein a user may view on a map a geometric shape that depicts an area within a geographic region that is expected to be reachable from a point of interest within a threshold period of time.

17 Claims, 4 Drawing Sheets

SYSTEMS AND APPARATUSES FOR GENERATING A GEOMETRIC SHAPE AND TRAVEL TIME DATA

TECHNOLOGICAL FIELD

The present disclosure relates to travel time determination and field of mapping systems, such as mapping systems used to map points of interest, such as real estate listings found in real estate inventory systems (Multiple Listing Service (MLS), for example) or other database systems. One aspect of the invention is directed toward a method for generating a geometric shape that depicts an area within a geographic region that is expected to be reachable from a point of interest within a threshold period of time.

BACKGROUND

A large portion of the human population consider proximity to points of interest (which may include work, school, public transit, for example) an important factor when selecting an area to buy a home. Many conventional mapping systems exist for plotting points of interest on a map and providing drive or commute time calculations. Other mapping services include computing isochrones. An isochrone shows points relating to a same value or equal value joined together on a diagram or a map. For example, an isochrone may be used to depict travel times, such as drawing a 30 minute travel time perimeter around a start location.

Isochrones may be used by would-be home buyers who want to determine what real estate listings or points of interest are reachable from a start location such as work or school within a predetermined travel time. However, such mapping services do not facilitate the calculation of travel times based on data indicating speed limits, traffic impediments, road directionality, pedestrian paths, bicycle paths, or public transit paths. Existing technical solutions also present problems in terms of calculating travel times using available processing capabilities in real time. More particularly, there exists a need for a mapping service that allows a user to precisely define and/or view points of interest or homes that are within a given travel time of a start location. Furthermore, there exists a need for a mapping service that is capable of quickly and efficiently generating an interactive map including a geometric shape having the points of interest mapped relative to the start location within a given travel time.

BRIEF SUMMARY

The needs outlined above are met by embodiments of the present invention which, in various embodiments, provides a method, apparatus, computer program product and system that overcomes many of the technical problems discussed above, as well other technical problems. According to one embodiment, the method provides generating a geometric shape that depicts an area within a geographic region that is expected to be reachable from a point of interest within a threshold period of time.

In particular, a method is provided herein that includes receiving a first input, at a user interface, the first input indicative of coordinates for a point of interest and receiving a second input, at the user interface, the second input indicative of a threshold period of time. The method may further include accessing graph data comprising a node set comprising a plurality of nodes and an edge set comprising a plurality of edges, wherein the node set represents road intersections, and the edge set represents road segments within a geographic region. The method further includes identifying a first node from the node set closest to the point of interest and programmatically search the graph data, using the first node, to identify a first geometric shape that depicts an area within the geographic region that is expected to be reachable from the point of interest within the threshold period of time. Accordingly, the method may include causing presentation of the geometric shape on a map of a user device.

In accordance with yet another example embodiment, an apparatus is provided that includes at least one processor and at least one memory including computer program code, the at least one memory and the computer program code configured to, with the at least one processor, cause the apparatus to at least receive a first input, at a user interface, the first input indicative of coordinates for a point of interest. The apparatus is further caused to receive a second input, at the user interface, the second input indicative of a threshold period of time. In an example embodiment, the apparatus is further caused to access graph data comprising a node set comprising a plurality of nodes and an edge set comprising a plurality of edges, wherein the node set represents road intersections, and the edge set represents road segments within a geographic region and identify a first node from the node set closest to the point of interest and programmatically search the graph data, using the first node, to identify a first geometric shape that depicts an area within the geographic region that is expected to be reachable from the point of interest within the threshold period of time. Accordingly, apparatus is further caused to present the geometric shape on a map of a user device.

In accordance with yet another example embodiment, a computer program product comprising a non-transitory memory medium having program code instructions stored thereon, the program code instructions which when executed by an apparatus causes the apparatus to at least receive a first input, at a user interface, the first input indicative of coordinates for a point of interest. The computer program product is further caused to receive a second input, at the user interface, the second input indicative of a threshold period of time. In an example embodiment, the computer program product is further caused to access graph data comprising a node set comprising a plurality of nodes and an edge set comprising a plurality of edges, wherein the node set represents road intersections, and the edge set represents road segments within a geographic region and identify a first node from the node set closest to the point of interest and programmatically search the graph data, using the first node, to identify a first geometric shape that depicts an area within the geographic region that is expected to be reachable from the point of interest within the threshold period of time. Accordingly, computer program product is further caused to present the geometric shape on a map of a user device.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
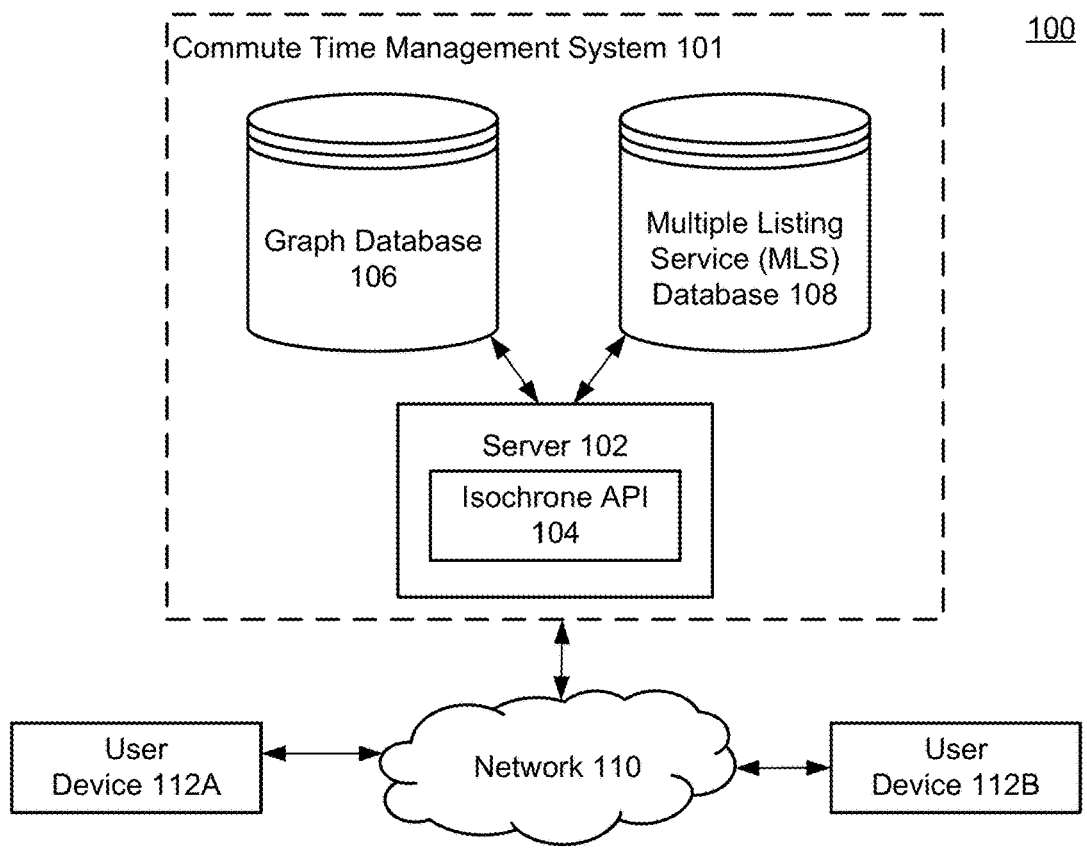
Figure 2:
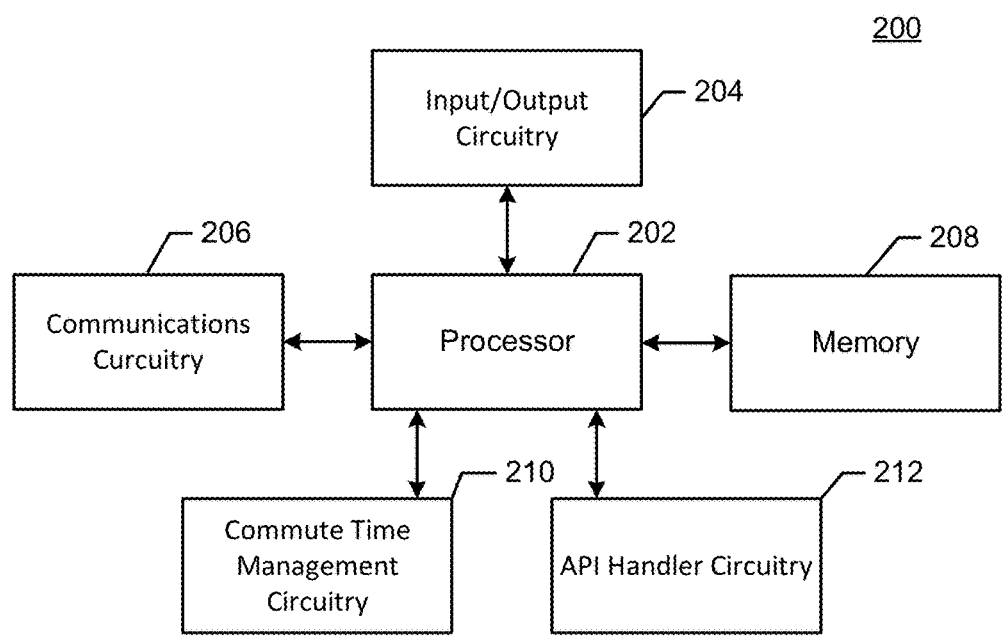
Figure 3:
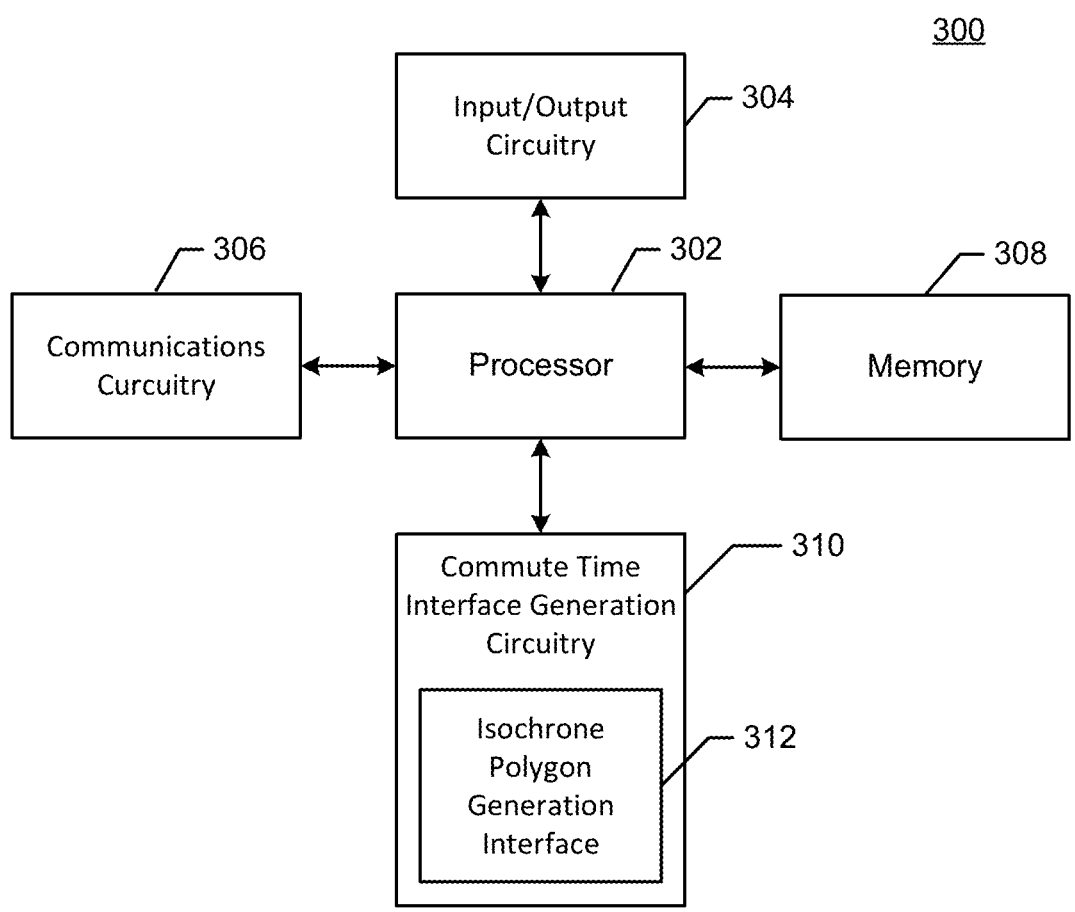
Figure 4:
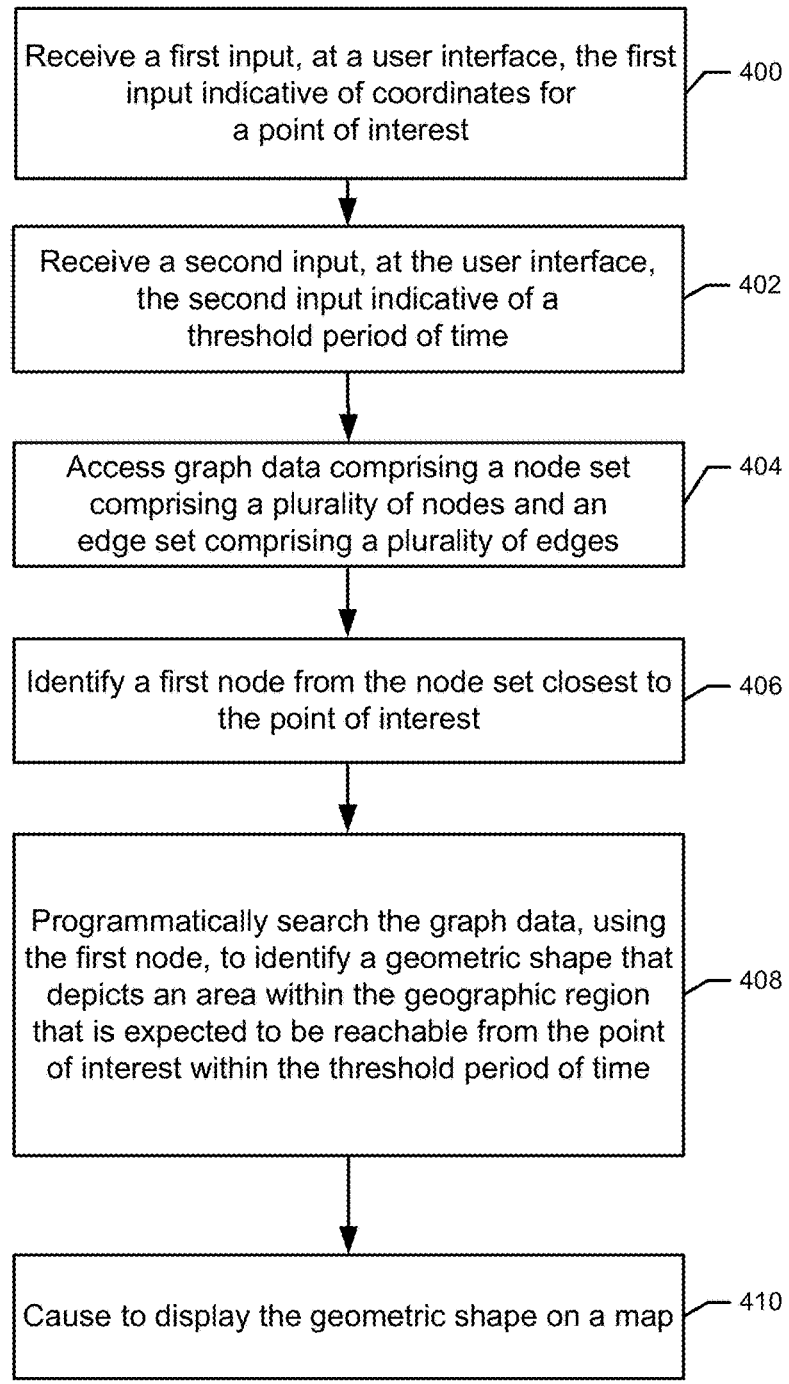
Figure 7:
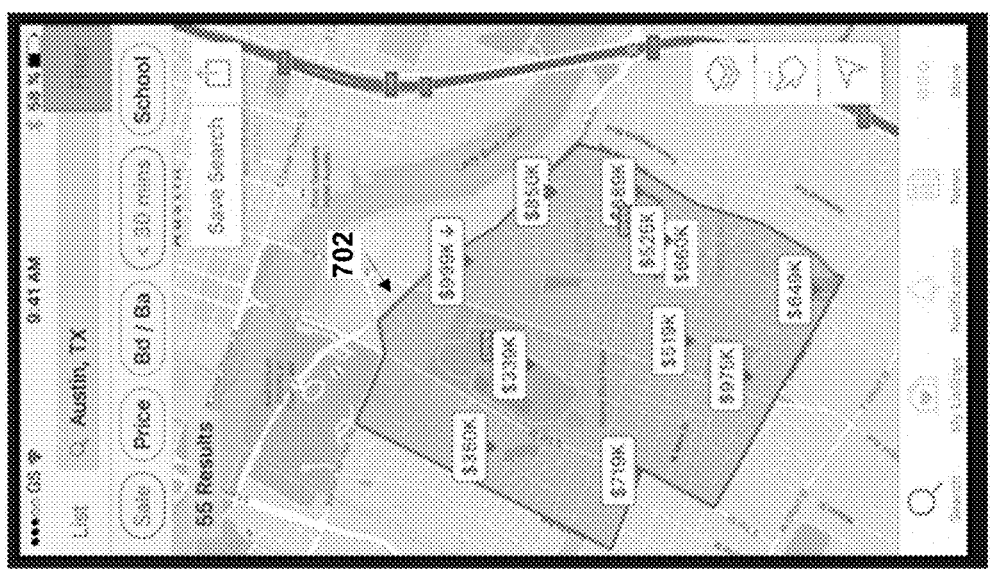
Figure 6:
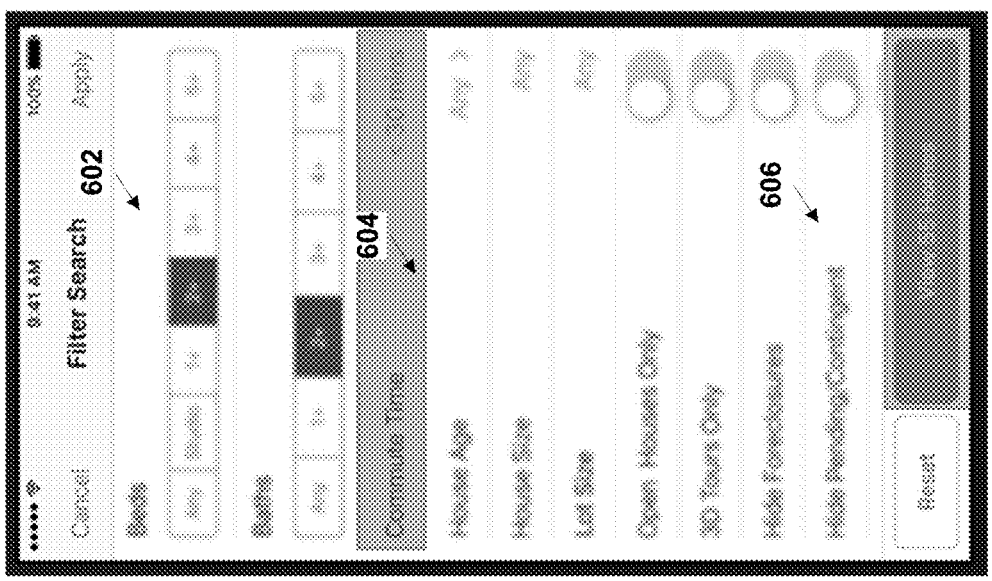
Figure 5:
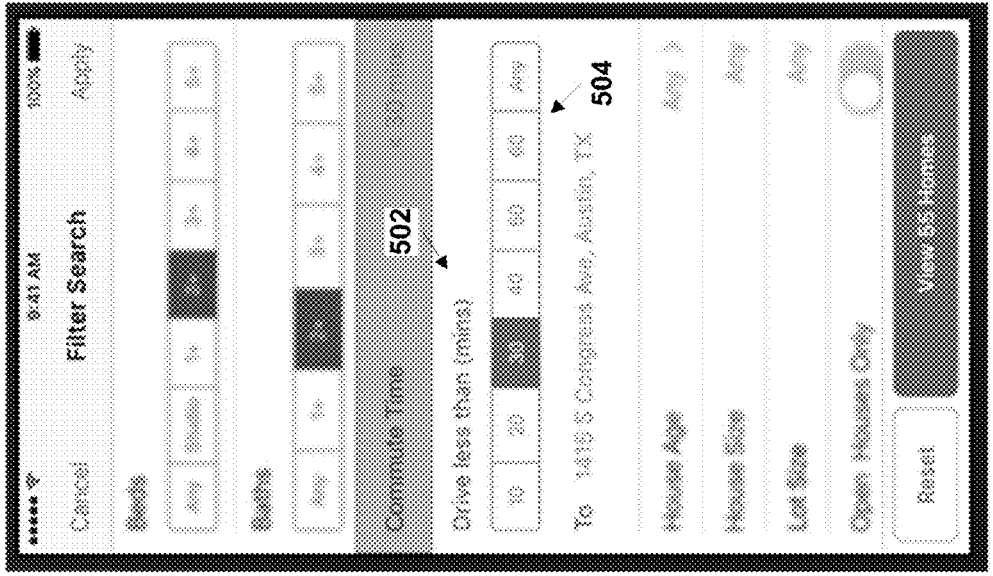

Having thus described certain example embodiments in general terms, reference will hereinafter be made to the accompanying drawings, which are not necessarily drawn to scale, and wherein:

FIG. 1 illustrates an example system structured in accordance with some embodiments discussed herein;

FIG. 2 illustrates a schematic block diagram of circuitry that can be included in a server structured in accordance with some embodiments discussed herein;

FIG. 3 illustrates a schematic block diagram of circuitry that can be included in a client device structured in accordance with some embodiments discussed herein;

FIG. 4 a flow diagram of example operations performed by a server configured in accordance with some embodiments discussed herein; and FIGS. 5, 6, and 7 illustrate example isochrone polygon generation interface structured in accordance with some embodiments discussed herein.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., one or more volatile or non-volatile memory device), can be differentiated from a "computer-readable transmission medium," which refers to an electromagnetic signal.

Reference is now made to FIG. 1, which is a schematic representation of a system that may support example embodiments. Users may access a commute time management system 101 via a communications network 110 using client devices 112A and 112B. The commute time management system 101 may comprise a server 102 that is disposed in communication with databases 106 and 108. It will be appreciated that databases 106 and 108 are provided as example databases, and any number of databases or data sources may be present in the system. The graph database 106 may provide information related to road network data. Multiple Listing Service (MLS) database 108 may provide any information relating to real property such as a home (e.g., single-family house, duplex, apartment, condominium, etc.), land, commercial property, and/or the like.

The data provided from any of databases 106 and 108 and/or other sources may be transmitted to the server 102 by various methods. For example, a listing syndication service may provide real property data to the server 102. In some examples, batch or routine processes may transmit newly added or updated real property data and/or listing data to the server 102. According to certain embodiments, the data may be provided to the server 102 continuously, such as in real-time or near real-time once it is received and/or generated at the various sources. As another example, the server 102 may explicitly request desired data from any of the data sources, such as in response to another process and/or module implemented on the server 102 and configured to query any of the data sources for such information.

The databases 106 and 108 are provided merely as examples, and it will be appreciated that many variations may be implemented and utilized in accordance with example embodiments. For example, although not illustrated in FIG. 1, server 102 may integrate with databases 106 and 108 through an isochrone API 104 and/or server.

In any event, databases 106 and 108 may provide any data, such as real property data and road network data, to server 102 that may be utilized according to example embodiments. As used herein, the term "real property data" may refer to any of the data described above that is provided to the server 102 and pertains to real property.

As used herein, the real property data may include a "real property record," which may include real property data that is specific to a particular real property. A "real property record" may therefore include a "real property listing," which may include a real property record and/or real property data that relates to an offering for sale, a past offering for sale, past transaction details of the particular property, and/or the like.

The server 102 may be embodied as a computer or group of computers. The server 102 may provide for receiving of road network data and real property data, from various sources, including but not necessarily limited to the databases 106 and 108. For example, the server 102 may be operable to receive and post or transmit communications provided by the client devices 112A and 112B.

An isochrone API 104 of the server 102 facilitates sharing road network data among and between the commute time management system 101 and the graph database 106. In various embodiments, the isochrone API 104 comprises all or part of the API handler circuitry discussed in connection with FIG. 2.

Communications network 110 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 110 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of commute time management system. In some embodiments, the protocol is a custom protocol of JSON (JavaScript Object Notation) objects sent via a Websocket channel. In some embodiments, the protocol is JSON over RPC ("remote procedural call), JSON over REST ("Representational State Transfer")/HTTP ("HyperText Transfer Protocol"), and the like.

The client devices 112A and 112B may be any computing device as defined above. Electronic data received by the server 102 from the client devices 112A and 112B may be provided in various forms and via various methods. For example, the client devices 112A and 112B may include desktop computers, laptop computers, smartphones, netbooks, tablet computers, wearables, and the like.

In embodiments where a client device 112A or 112B is a mobile device, such as a smartphone or tablet, the client device 112A or 112B may execute an "app" to interact with the commute time management system 101. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system Additionally or alternatively, the client devices 112A and 112B may interact with the commute time management system 101 via a web browser. As yet another example, the client devices 112A and 112B may include various hardware or firmware modules designed to interface with the commute time management system 101.

In accordance with some embodiments, the server 102 may be implemented by apparatus 200, such as that shown in FIG. 2 and described in more detail below.

FIG. 2 shows a schematic block diagram of circuitry of apparatus 200, some or all of which may be included in, for example, server 102. Any of the aforementioned systems or devices may include the circuitry 200 and may be configured to, either independently or jointly with other devices in a communications network 110 perform the functions of the circuitry 200 described herein. As illustrated in FIG. 2, in accordance with some example embodiments, circuitry 200 may comprise various means, such as processor 202, a memory 208, input/output circuitry 204, communications circuitry 206, API handler circuitry 212, and commute time management circuitry 210. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 208 may provide storage functionality, the communications circuitry 206 may provide network interface functionality, and the like.

In some embodiments, the apparatus 200 may also optionally include a user interface (not shown). In some example, apparatus 200 need not necessarily be embodied by a server, and may be embodied by a wide variety of devices including personal computers and/or work stations.

In some embodiments, the processor 202 (and/or co-processors or any other processing circuitry assisting or otherwise associated with the processor 202) may be in communication with the memory device 208 via a bus for passing information among components of the apparatus 200. The memory device 208 may include, for example, one or more volatile and/or non-volatile memories. In other words, for example, the memory device 208 may be an electronic storage device (e.g., a computer readable storage medium) comprising gates configured to store data (e.g., bits) that may be retrievable by a machine (e.g., a computing device like the processor 202). The memory device 208 may be configured to store information, data, content, applications, instructions, or the like for enabling the apparatus to carry out various functions in accordance with an example embodiment of the present invention. For example, the memory device 208 could be configured to buffer input data for processing by the processor 202. Additionally or alternatively, the memory device 208 could be configured to store instructions for execution by the processor 202. The memory device 208 could be further configured to store the annotated image data generated as described herein according to example embodiments.

The apparatus 200 may, in some embodiments, be embodied in various devices as described above. However, in some embodiments, the apparatus 200 may be embodied as a chip or chip set. In other words, the apparatus 200 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 200 may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor 202 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 202 may include one or more processing cores configured to perform independently. A multi-core processor may enable multiprocessing within a single physical package. Additionally or alternatively, the processor 202 may include one or more processors configured in tandem via the bus to enable independent execution of instructions, pipelining and/or multithreading.

In an example embodiment, the processor 202 may be configured to execute instructions stored in the memory device 208 or otherwise accessible to the processor 202. Alternatively or additionally, the processor 202 may be configured to execute hard coded functionality. As such, whether configured by hardware or software methods, or by a combination thereof, the processor 202 may represent an entity (e.g., physically embodied in circuitry) capable of performing operations according to an embodiment of the present invention while configured accordingly. Thus, for example, when the processor 202 is embodied as an ASIC, FPGA or the like, the processor 202 may be specifically configured hardware for conducting the operations described herein. Alternatively, as another example, when the processor 202 is embodied as an executor of software instructions, the instructions may specifically configure the processor 202 to perform the algorithms and/or operations described herein when the instructions are executed. However, in some cases, the processor 202 may be a processor of a specific device (e.g., a mobile terminal or network entity) configured to employ an embodiment of the present disclosure by further configuration of the processor 202 by instructions for performing the algorithms and/or operations described herein. The processor 202 may include, among other things, a clock, an arithmetic logic unit (ALU) and logic gates configured to support operation of the processor 202.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

In some embodiments, the apparatus 200 may include input/output circuitry 204 that may, in turn, be in communication with processor 202 to provide output to the user and, in some embodiments, to receive an indication of a user input. The input/output circuitry 204 may comprise a user interface and may include a display and may comprise a web user interface, a mobile application, a client device, a kiosk, or the like. In some embodiments, the input/output circuitry 204 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 208, and/or the like).

The API handler circuitry 212 is operable to handle various API calls from the database 106 and 108. For example, the API handler circuitry 212 may handle an API call to retrieve road network data. Alternatively, the commute time management circuitry 210 is configured to subscribe to an API of graph database 106 to receive updates in the form map data objects.

In one example embodiment, the commute time management circuitry 210 is configured to push or transmit the updates to a data buffer pool. Updates in the data buffer pool include all possible changes in all map data objects. In one embodiment, commute time management circuitry 210 (or the API handler circuitry 212 on its behalf) may request that graph database 106 provide updates in the form of map data objects upon creation, deletion, or change of the geometric shape.

FIG. 3 shows a schematic block diagram of circuitry 300, some or all of which may be included in, for example, client devices 112A and 112B. Any of the aforementioned systems or devices may include the circuitry 300 and may be configured to, either independently or jointly with other devices in a communications network 101 perform the functions of the circuitry 300 described herein. As illustrated in FIG. 3, in accordance with some example embodiments, circuitry 300 can include various means, such as processor 302, a memory 308, input/output circuitry 304, communications circuitry 306, and commute time interface generation circuitry 310.

The apparatus 300 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 300 may provide or supplement the functionality of particular circuitry. For example, the processor 302 may provide processing functionality, the memory 308 may provide storage functionality, the communications circuitry 306 may provide network interface functionality, and the like.

In some embodiments, the processor 302 (and/or co-processor or any other processing circuitry assisting or otherwise associated with the processor) may be in communication with the memory 308 via a bus for passing information among components of the apparatus. The memory 308 may be non-transitory and may include, for example, one or more volatile and/or non-volatile memories. In other words, for example, the memory may be an electronic storage device (e.g., a computer readable storage medium). The memory 308 may be configured to store information, data, content, applications, computer coded instructions, or the like, for enabling the apparatus 300 to carry out various functions in accordance with example embodiments of the present disclosure.

The processor 302 may be embodied in a number of different ways and may, for example, include one or more processing devices configured to perform independently. Additionally or alternatively, the processor may include one or more processors configured in tandem via a bus to enable independent execution of computer coded instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 302 may be configured to execute computer coded instructions stored in the memory 308 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the computer coded instructions may specifically configure the processor to perform the algorithms and/or operations described herein when the computer coded instructions are executed.

In some embodiments, the apparatus 300 may include input/output circuitry 304 that may, in turn, be in communication with processor 302 to provide output to the user and, in some embodiments, to receive an indication of a user input. The input/output circuitry 304 may comprise a user interface and may include a display and may comprise a web user interface, a mobile application, a client device, a kiosk, or the like. In some embodiments, the input/output circuitry 304 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 306 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 306 may include, for example, a network interface for enabling communications with a wired or wireless communication network. For example, the communications circuitry 306 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The commute time interface generation circuitry 310 is configured to provide an isochrones polygon generation interface having an isochrone polygon generation interface 312. The commute time interface generation circuitry 310 is configured to facilitate user interaction with a commute time management system. In one example, the isochrone polygon generation interface 312 provides a user of a client device a view of a plurality of points of interest on a map for a given threshold of travel time.

As described above and as will be appreciated based on this disclosure, embodiments of the present disclosure may be configured as computer implemented methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code instructions stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein FIG. 4 is a flowchart of operations that may be performed by server 102, according to example embodiments.

In operation 400, the server 102 may include means, such as communications circuitry 206, processor 202, memory 208 and/the like, for receiving a first input, at a user interface, the first input indicative of coordinates for a point of interest. In one embodiment of the commute time management system 101, the server 102 provides a user interface 500 or other similar electronic form to the user of client device 112A as depicted in FIG. 5. As shown in FIG. 5, using the user interface 500, the user may define a user input comprising a selected or entered point of interest defined by element 504. Such point of interest may include the user's home, place of work or business, or the like. Additionally or alternatively, the user input may accept the client device's Global Positioning System (GPS) derived position as the point of interest. In one example, the user of client device 112A may be searching for an apartment and desires prospective apartments within a driving time of 30 minutes from the user's workplace.

Continuing to operation 402, the server 102 may include means, such as the communications circuitry 206, processor 202, memory 208 and/the like for receiving a second input, at the user interface, the second input indicative of a threshold period of time. The threshold period of time representative of the driving time in one example. As shown in FIG. 5, a user input may be provided comprising a selected commute time 502 from the point of interest 504, wherein the selected commute time 502 may be selected from a list of commute times as shown in user interface 600. For example, the user can elect to display real properties within a user selected threshold commute time, such as 30 minutes. It will be appreciated that the server 102 may further include means, such as the communications circuitry 206, processor 202, memory 208 and/the like for receiving a mode of transportation (e.g., walking, driving, bicycling, etc.). The process can further include accessing and searching graph data to identify a geometric shape for the selected commute time and determining a predicted commute time from the point of interest (e.g., work) to other points of interest (e.g., prospective real properties).

Furthermore, as shown generally in FIG. 6, the user may define desired characteristics of real properties as depicted by elements 602 and 604. For example, the user may define the number of bedrooms, number of bathrooms, house age, house size, lost size, etc.

The user interface 600 may further include a selection graphical user interface element 606 to view the real properties based on the point of interest and desired commute time. In this regard, when a user selects to view the real properties and/or points of interest within a desired commute time from the point of interest, the user sees the geometric shape comprising a polygon having a listing of real properties and/or points of interest reachable from the point of interest within the desired commute time. According to some embodiments, the server 102 may include means, such as the communications circuitry 206, processor 202, memory 208 and/the like, for replacing a previously displayed polygon with one or more new polygons dependent on the threshold period of time. In this regard, a user may see a plurality of geometric shapes according to commute time. Additionally, the geometric shapes may change according to the mode of transportation.

In operation 404, the server 102 may include means, such as the communications circuitry 206, processor 202, memory 208 and/the like, for accessing graph data from graph database 106 comprising a node set comprising a plurality of nodes and an edge set comprising a plurality of edges. The node set representing road intersections, and the edge set representing road segments within a geographic region.

In some example embodiments, the server 102 may include means, such as the communications circuitry 206, processor 202, memory 208 and/the like, for inputting raw open street map (OSM) data that is retrievable from the Open Street Map website (www.openstreetmap.org). The receipt or input of the raw input data may occur in response to an OSM data update. Alternatively or additionally the server 102 may include means, such as the communications circuitry 206, processor 202, memory 208 and/the like, for receiving or inputting raw OSM data continuously or semi-continuously, such as via a data stream, and determining new versions of OSM data for a target geographic region.

In an example embodiment, the server 102 may include means, such as the communications circuitry 206, processor 202, memory 208 and/the like, for implementing pre-processing steps to parse the OSM data, transform the OSM data into nodes and edges in a representation such that the server 102 may be configured to build a geometric shape that encompasses a desired commute time, enhance the OSM data, and reduce the size of the OSM data. Such pre-processing may include parsing for all of the drivable, road-type elements (ignoring bike trails, foot paths, and the like), excluding unimportant OSM data to the current search query, processing the resulting OSM data into graph data comprising nodes and edges, and generating isochrones. More specifically, the server 102 may include means, such as the communications circuitry 206, processor 202, memory 208 and/the like, for obtaining a geometric polygon corresponding to a generated isochrone from the user's query comprising a point of interest and a threshold period of time. Essentially, isochrone polygon calculation is used to generate the largest geographic area that the user could commute to within the threshold period of time from the point of interest. In this case, a pre-processing step may be performed comprising identifying nodes and edges of a geographic region which do not contribute to "drivable roads" such as bicycle only lanes, service roads, walking paths, and the like. The nodes and edges determined unimportant or do not contribute to a commutable path based on transportation mode may be excluded from the graph data. In one exemplary technique, one or more nodes may be removed and/or nodes may be merged into a single node. The server 102 may include means, such as the communications circuitry 206, processor 202, memory 208 and/the like, for leveraging geohashes to uniquely identify each node in the graph data and merge nodes that occupy the same geohash into a single node. For example, the server 102 may include means, such as the communications circuitry 206, processor 202, memory 208 and/the like, for identifying nodes that are close together or within a close proximity, such as within a proximity of within 100 m of each other, and merge the identified nodes into a single node so as to reduce the number of nodes and edges that are processed without losing accuracy.

The server 102 may include means, such as the communications circuitry 206, processor 202, memory 208 and/the like, for transforming the graph data by embedding supplemental data such as traffic impediments that affect the commute time such as traffic signals, stop signs, pedestrian crossings, train crossings, and the like. In other words, a number of factors may affect travel times. The isochrones can therefore be made more accurate by incorporating data regarding these types of traffic impediments into the graph data.

As described above, the present invention is provided through an example embodiment of a road network. In this manner, commute time management system 101 may be configured to employ information/data representations of points as nodes and paths as edges. The nodes denote, for example, road intersections. The edges denote, for example, road segments or pathways connecting nodes within the road network. Each edge of the edge set comprises a weighting value, wherein the weighting value includes data indicating speed limits, traffic impediments, road directionality, pedestrian paths, bicycle paths, or public transit paths.

The server 102 may further include means, such as the communications circuitry 206, processor 202, memory 208 and/the like, for determining time and fare information from public transportation web sites or other sources in the public domain to determine commuting costs and timing. Other information such as tolls may be received from public transportation or government run web sites.

Returning to operations of FIG. 4, the server 102 may include means, such as the communications circuitry 206, processor 202, memory 208 and/the like, for determining the coordinates of a bounding polygon given a point of interest and a threshold period of time. In one example, the server 102 may include means, such as the communications circuitry 206, processor 202, memory 208 and/the like, for calculating shortest path points between nodes for each node of the node set based on the dijkstra's shortest path algorithm.

The server 102 may further include means, such as the communications circuitry 206, processor 202, memory 208 and/the like, for filtering out the shortest path points that violate the threshold period of time constraint. In some example embodiments, the server 102 may further include means, such as the communications circuitry 206, processor 202, memory 208 and/the like, for truncating the latitudes and longitudes of the shortest path points and merging them thereby reducing the number of shortest path points. The resulting shortest path points are then used to build a geometric shape comprising a convex hull polygon which is further truncated and simplified according to one or more parameters such as the threshold period of time, traffic impediments, and/or mode of transportation.

In operation 406, the server 102 may include means, such as the communications circuitry 206, processor 202, memory 208 and/the like, for identifying a first node from the node set closest to the point of interest. The server 102 may include means, such as the communications circuitry 206, processor 202, memory 208 and/the like, for programmatically searching the graph data, using the first node, to identify a geometric shape that depicts an area within the geographic region that is expected to be reachable from the point of interest within the threshold period of time as shown in operation 408. That is, the geometric shape comprises the point of interest and a polygon comprising a plurality of line segments connecting a corresponding plurality of radial endpoints extending radially outward to a distance corresponding to the threshold period of time from the point of interest. In this regard, the polygon includes all points of interest reachable within the drive time and that excludes all points of interest not reachable within the drive time.

According to certain example embodiments, the server 102 may include means, such as the communications circuitry 206, processor 202, memory 208 and/the like, for excluding pathways based on the mode of transportation (e.g., driving, walking, bicycling, using public transit). For example, paths unsuitable for cars such as bicycle only paths are excluded from the calculation of travel time.

Continuing now to operation 410, the server device 102 may include means, such as the communications circuitry 206, processor 202, memory 208, and/or the like, for causing to display the geometric shape on a map of a user interface as shown in FIG. 7. FIG. 7 provides example geometric shape 702 that may be generated according to certain example embodiments. As described herein with respect to various embodiments, the geometric shape 702 comprise not only the points of interest but also, in some cases, location data corresponding to the points of interest. The retrieved points of interest having location data corresponding to the area defined by the geometric shape may consist of real estate listings, business locations, visitor attractions, schools, places of worship, parks, roadways, public transit, and combinations thereof. The server device 102 may include means, such as the communications circuitry 206, processor 202, memory 208, and/or the like, for receiving an initial user input comprising a selected point of interest represented as interactive icons. The interactive icons displayed in the map 700 relative to the geometric shape 702 may comprise internet hyperlinks to a detailed real estate listing (such as the corresponding listing in the MLS database 108 (which, as described herein, may comprise the Multiple Listing Service (MLS)).

In other embodiments, a user may call up a geometric shape (stored in a data cache of a memory device 308, for example) corresponding to a selected threshold period of time and modify the resulting shape to increase or decrease the threshold of time resulting in a custom selected geometric shape. Such embodiments may provide a user interface that is at least partially graphical in nature, allowing the user to drag points on a screen (using a mouse, trackball, or other input device, for example) to re-format a shape of the geometric shape 702 to create a customized geometric shape with varying commute times and as a result varying points of interest.

In other embodiments, a user may "freehand" draw a shape and edit the shape to shift a boundary. In other embodiments a user may call up a geometric shape (stored in a data cache of a memory device 308, for example) corresponding to a selected neighborhood and modify the resulting shape to exclude a part of the neighborhood that the user may consider undesirable.

Example embodiments provided herein provide numerous technical advantages to the server 102 and/or the system in which it operates. Without the functionality of the example embodiments described herein, calculating accurate isochrones/geometric shapes is time consuming especially for large maps, because of the large number of data points to be processed. The present invention transforms data based on commute requirements and presents points of interest (e.g., real properties, schools, parks, businesses, etc.) within said commute requirements. Accordingly, the processing resources and/or amount of memory utilized for facilitating the commute time search and home search may be reduced. As such, example embodiments provide improvements to the technology of real property electronic data provision.

As set forth above, the above examples and embodiments described herein provide numerous ways to integrate concepts relating to commute time management; travel and commute guidance specially adapted for specific applications and/or the like into the practical application of enhancing presentation of real property data and better informing the user of the amount of time it takes to travel to a particular destination.

It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or enhanced. Furthermore, in some embodiments, additional optional operations may be included. Modifications, additions, or enhancements to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and the computer program code configured to, with the at least one processor, cause the apparatus to:
   receive a first input, at a user interface, the first input indicative of coordinates for a point of interest;
   receive a second input, at the user interface, the second input indicative of a threshold period of time;
   access graph data comprising a node set comprising a plurality of nodes and an edge set comprising a plurality of edges, wherein the node set represents road intersections, and the edge set represents road segments within a geographic region;
   identify a first node from the node set closest to the point of interest;
   programmatically search the graph data, using the first node, to identify a geometric shape that depicts an area within the geographic region that is expected to be reachable from the point of interest within the threshold period of time, by causing the apparatus to:
      programmatically apply to each edge of the edge set a weighting value, wherein the weighting value includes data indicating speed limits, traffic impediments, road directionality, and road type; and
      automatically repeat identifying the geometric shape that depicts the area within the geographic region that is expected to be reachable from the point of interest within the threshold period of time to reflect the weighting value of each edge of the edge set; and
   cause to display the geometric shape on a map of the user interface.

2. The apparatus of claim 1, wherein the at least one memory and the computer program code are further configured to, with the at least one processor, cause the apparatus to:
   retrieve a plurality of other points of interest having location data corresponding to the area defined by the geometric shape; and
   cause to display the plurality of other points of interest on the map, wherein the displayed map comprises the geometric shape and a plurality of interactive icons corresponding to the other points of interest.

3. The apparatus of claim 2, wherein the other points of interest are selected from a group consisting of:
   real estate listings;
   business locations;
   visitor attractions;
   schools;
   places of worship;
   parks;
   roadways; and
   public transit.

4. The apparatus of claim 1, wherein the geometric shape comprises the point of interest and a polygon comprising a plurality of line segments connecting a corresponding plurality of radial endpoints extending radially outward to a distance corresponding to the threshold period of time from the point of interest.

5. The apparatus of claim 1, wherein the at least one memory and the computer program code are further configured to, with the at least one processor, cause the apparatus to:
   receive a mode of transportation; and
   update the weighting value of each edge of the edge set based on the mode of transportation.

6. The apparatus of claim 5, wherein the mode of transportation comprises at least one of walking, driving, bicycling, or commuting by public transit.

7. A method comprising:
   receiving a first input, at a user interface, the first input indicative of coordinates for a point of interest;
   receiving a second input, at the user interface, the second input indicative of a threshold period of time;
   accessing graph data comprising a node set comprising a plurality of nodes and an edge set comprising a plurality of edges, wherein the node set represents road intersections, and the edge set represents road segments within a geographic region;
   identifying a first node from the node set closest to the point of interest;
   programmatically searching the graph data, using the first node, to identify a geometric shape that depicts an area within the geographic region that is expected to be reachable from the point of interest within the threshold period of time, by programmatically applying to each edge of the edge set a weighting value, wherein the weighting value includes data indicating speed limits, traffic impediments, road directionality, and road type; and automatically repeating identifying the geometric shape that depicts the area within the geographic region that is expected to be reachable from the point of interest within the threshold period of time to reflect the weighting value of each edge of the edge set; and
   causing to display the geometric shape on a map of the user interface.

8. The method of claim 7 further comprising:
   retrieving a plurality of other points of interest having location data corresponding to the area defined by the geometric shape; and
   causing to display the plurality of other points of interest on the map, wherein the displayed map comprises the geometric shape and a plurality of interactive icons corresponding to the other points of interest.

9. The method of claim 8, wherein the other points of interest are selected from a group consisting of:
real estate listings;
business locations;
visitor attractions;
schools;
places of worship;
parks;
roadways; and
public transit.

10. The method of claim 7, wherein the geometric shape comprises the point of interest and a polygon comprising a plurality of line segments connecting a corresponding plurality of radial endpoints extending radially outward to a distance corresponding to the threshold period of time from the point of interest.

11. The method of claim 7, further comprising:
receiving a mode of transportation; and
updating the weighting value of each edge of the edge set based on the mode of transportation.

12. The method of claim 11, wherein the mode of transportation comprises at least one of walking, driving, bicycling, or commuting by public transit.

13. A computer program product comprising at least one computer readable non-transitory memory medium having program code instructions stored thereon, the program code instructions which when executed by an apparatus causes the apparatus at least to:
receive a first input, at a user interface, the first input indicative of coordinates for a point of interest;
receive a second input, at the user interface, the second input indicative of a threshold period of time;
access graph data comprising a node set comprising a plurality of nodes and an edge set comprising a plurality of edges, wherein the node set represents road intersections, and the edge set represents road segments within a geographic region;
identify a first node from the node set closest to the point of interest;
programmatically search the graph data, using the first node, to identify a geometric shape that depicts an area within the geographic region that is expected to be reachable from the point of interest within the threshold period of time, by causing the apparatus to:
programmatically apply to each edge of the edge set a weighting value, wherein the weighting value includes data indicating speed limits, traffic impediments, road directionality, and road type; and
automatically repeat identifying the geometric shape that depicts the area within the geographic region that is expected to be reachable from the point of interest within the threshold period of time to reflect the weighting value of each edge of the edge set; and
cause to display the geometric shape on a map of the user interface.

14. The computer program product of claim 13, wherein the at least one memory and the computer program code are further configured to, with the at least one processor, cause the apparatus to:
retrieve a plurality of other points of interest having location data corresponding to the area defined by the geometric shape; and
cause to display the plurality of other points of interest on the map, wherein the displayed map comprises the geometric shape and a plurality of interactive icons corresponding to the other points of interest.

15. The computer program product of claim 14, wherein the other points of interest are selected from a group consisting of:
real estate listings;
business locations;
visitor attractions;
schools;
places of worship;
parks;
roadways; and
public transit.

16. The computer program product of claim 13, wherein the geometric shape comprises the point of interest and a polygon comprising a plurality of line segments connecting a corresponding plurality of radial endpoints extending radially outward to a distance corresponding to the threshold period of time from the point of interest.

17. The computer program product of claim 13, wherein the at least one memory and the computer program code are further configured to, with the at least one processor, cause the apparatus to:
receive a mode of transportation; and
update the weighting value of each edge of the edge set based on the mode of transportation.

* * * * *